United States Patent Office 2,745,826
Patented May 15, 1956

2,745,826
PROCESS OF PREPARING THIOUREA COMPLEXES

Serge Semenoff, New Brunswick, and Morris A. Dolliver, Stelton, N. J., assignors to Olin Mathieson Chemical Corporation, New York, N. Y., a corporation of Virginia No Drawing. Application December 16, 1953, Serial No. 398,637

6 Claims. (Cl. 260—96.5)

This invention relates to, and has for its object the provision of, an improved process of preparing a thiourea complex of a 2-(halo)pyridine 1-oxide of the general Formula II:

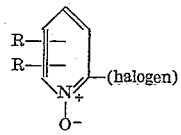

wherein each R is a member of the class consisting of hydrogen, lower alkyl, (lower alkyl)-oxy and halogen.

The preparation of such thiourea complexes by heating an (isolated) 2-(halo)pyridine 1-oxide, in its acid-addition salt form with thiourea in alcohol has previously been reported. However, by the improved process of this invention, such complexes are prepared with fewer steps in less time and/or in a substantially greater yield; and there are other advantages as well.

The process of this invention essentially comprises interacting a 2-(halo)pyridine 1-oxide of the general Formula II with a thiourea (including substituted thioureas, such as allyl-thiourea and ethyl-thiourea), preferably the unsubstituted thiourea, in a solvent for the reactants, and recovering the reaction product. Utilizable reactants of the general Formula II include, inter alia: 2-bromopyridine 1-oxide; 2-bromo-4-methylpyridine 1-oxide; 2,5-dibromopyridine 1-oxide; 2-chloropyridine 1-oxide; 2-bromo-4,6-dimethylpyridine 1-oxide; 2-bromo-3-methoxypyridine 1-oxide; 2-bromo-3-ethyl-6-methylpyridine 1-oxide; 2-bromo-3-methylpyridine 1-oxide; 2-bromo-5-methylpyridine 1-oxide; 2-chloro-4-methylpyridine 1-oxide; 2-bromo-4-ethylpyridine 1-oxide; 2,3-dichloropyridine 1-oxide; and 2-bromo-3-ethoxypyridine 1-oxide. Utilizable solvents include the lower aliphatic alcohols and mixtures thereof, especially isopropyl alcohol. Preferably at least one R in the general Formula II is hydrogen.

In a preferred embodiment of this invention, the 2-(halo)pyridine 1-oxide of the general Formula II is used as a reactant without isolation from the reaction mixture in which it is formed. Thus, a 2-(halo)pyridine compound of the general Formula III:

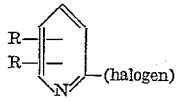

wherein each R substituent has the meaning given hereinbefore, is interacted with an oxidizing agent of the peroxide type (inter alia, hydrogen peroxide in trifluoroacetic acid, or a peracid such as performic, perphthalic, perbenzoic in chloroform, and especially peracetic in acetic acid) to form the correspondingly R-substituted 2-(halo)pyridine 1-oxide; the reaction mixture containing said 1-oxide is then treated with a thiourea in a solvent for the reactants; and the resulting product, a thiourea complex, is recovered.

The thiourea complex obtained is particularly useful in the preparation of 2-mercaptopyridine 1-oxides of the general formula:

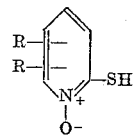

Thus, for example, the complex (prepared as described hereinbefore) may be treated with a base (such as sodium carbonate), in a solvent for the reactants, the mixture then acidified, and the reaction product recovered.

The following examples are illustrative, but by no means limitative, of the invention.

PREPARATION OF 2-MERCAPTOPYRIDINE 1-OXIDE

*(a) Thiourea complex of 2-mercaptopyridine 1-oxide*

To 790 g. 2-bromopyridine, chilled to 8–12° C., is added, 2,000 g. 40% peracetic acid with stirring over a 25–30 minute period. After the addition of the acid, the temperature is allowed to reach 40° C. at which point cooling is applied and the temperature maintained at 40–45° C. for 45 minutes. The cooling bath is removed and the temperature is raised to 65° C., over a period of 15–20 minutes, and maintained for 2 hours. At this time the temperature is raised to 80° C. and maintained for 10–20 minutes, at which point there is a sharp color change from a light yellow to a dark brown. After this color change, the reaction mixture is cooled to 60–65° C. and poured into a hot suspension of 475 gm. thiourea in 6 liters of isopropanol. The resultant mixture is brought to reflux (82° C.), allowed to reflux for 15 minutes, and then cooled to room temperature. The precipitated thiourea complex is filtered off, washed with 200 ml. isopropanol and dried at 60° C. The product presumably has the following structure.

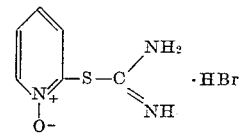

melts at about 160° C. and weighs about 887 g. (an about 71% yield).

*(b) 2-mercaptopyridine 1-oxide*

The thiourea complex obtained in *a* is dissolved in 8 liters of distilled water, and 713 g. sodium carbonate is added. After agitation for 5 hours at room temperature, the solution is acidified with 1740 ml. (1:1) hydrochloric acid to pH 2.3. The precipitated product is filtered off, washed with 600 ml. distilled water and dried in vacuum over $P_2O_5$. The product, 2-mercaptopyridine 1-oxide, weighs about 390 g. (amounting to a step-wise yield of about 84.8% and an overall yield of about 60.3%).

Alternatively a molar equivalent of 2-chloropyridine is used in place of the 2-bromopyridine in the foregoing example to produce the thiourea complex (hydrochloride).

Use of a molar equivalent of 2-bromo-4-methylpyridine, 2-bromo-3-ethoxypyridine, or 2,5-dibromopyridine in place of the 2-bromopyridine in the foregoing example similarly yields the (correspondingly-substituted) thiourea complexes.

The 2-mercaptopyridine 1-oxide may conveniently be converted into an alkali-metal salt, its sodium salt, for example, as follows: To a filtered solution of 41.8 g. 2-mercaptopyridine 1-oxide in 250 ml. acetone is added a sodium hydroxide solution (12.5 g. sodium hydroxide in 12.5 ml. water, diluted with 25 ml. methanol) over a period of about twelve minutes, with stirring, followed by 50 ml. acetone (pH of mixture is 6.1). An additional 240 ml. acetone is then added, over a period of seven minutes, and the solution is seeded with the crystalline salt. The mixture is then allowed to stand at room temperature for 1 hour, held at 5° C. for about three-fourths of an hour, and the resulting crystals are collected on a suction filter, and desiccator dried. The crystalline product, the sodium salt of 2-mercaptopyridine 1-oxide, weighs 48.7 g. (a 93.3% step-wise yield, based on sodium hydroxide).

The data which follows compares the yields obtained employing the prior method and the improved method of this invention: Using 2-bromopyridine 1-oxide hydrochloride to prepare the thiourea complex, the average yield (in four representative runs) is 69.9%; and the average overall yield (in said four runs), including the initial preparation (and isolation) of the 1-oxide hydrochloride as taught by the prior method, is 49.6%. Using the improved method of this invention, the average yield of the thiourea complex (in five representative runs) is 88.9%; and the average overall yield of the thiourea complex (starting from the reaction of the 2-(halo) pyridine with peracetic acid, and employing the reaction mixture containing the resultant 2-bromopyridine 1-oxide in the preparation of the thiourea complex) is 68.1%.

The invention may be variously otherwise embodied within the scope of the appended claims.

We claim:

1. The method which comprises interacting a 2-(halo)-pyridine compound of the general formula:

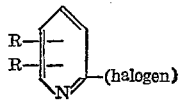

wherein each R is a member of the class consisting of hydrogen, lower alkyl, (lower alkyl)-oxy and halogen, with an oxidizing agent of the peroxide type to form the correspondingly-substituted 1-oxide base; treating the reaction mixture containing said 1-oxide base with a thiourea, in a solvent for the reactants; and recovering the thiourea complex formed.

2. The method of claim 1, wherein the oxidizing agent of the peroxide type is peracetic acid.

3. The method of claim 1, wherein at least one R is hydrogen, and the reaction of the 2-(halo)-pyridine compound with the oxidizing agent is at a temperature no greater than about 100° C.

4. The method of claim 1, wherein the solvent for the reactants is isopropyl alcohol.

5. The method of claim 1, wherein the 2-(halo)-pyridine compound is 2-bromopyridine.

6. The method of claim 5, wherein the oxidizing agent is peracetic acid.

References Cited in the file of this patent

UNITED STATES PATENTS

| | | |
|---|---|---|
| 2,295,606 | Riethof | Sept. 15, 1942 |
| 2,640,051 | Lynch | May 26, 1953 |
| 2,642,423 | Gorin | June 16, 1953 |
| 2,653,147 | Ackerman | Sept. 22, 1953 |
| 2,681,333 | Gorin | June 15, 1954 |
| 2,681,904 | Hyer et al. | June 22, 1954 |
| 2,686,786 | Shaw et al. | Aug. 17, 1954 |